(12) United States Patent
Maeda (10) Patent No.: US 10,019,209 B2
(45) Date of Patent: Jul. 10, 2018

(54) IMAGE PROCESSING APPARATUS, IMAGE PROCESSING METHOD, AND PROGRAM

(71) Applicant: Shunichi Maeda, Tokyo (JP)

(72) Inventor: Shunichi Maeda, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/957,899

(22) Filed: Dec. 3, 2015

(65) Prior Publication Data
US 2016/0162237 A1 Jun. 9, 2016

(30) Foreign Application Priority Data

Dec. 9, 2014 (JP) .................... 2014-249158
Oct. 14, 2015 (JP) .................... 2015-203086

(51) Int. Cl.
*G06F 3/12* (2006.01)
*H04N 1/23* (2006.01)

(52) U.S. Cl.
CPC .......... *G06F 3/1265* (2013.01); *G06F 3/1204* (2013.01); *G06F 3/1227* (2013.01); *G06F 3/1247* (2013.01); *H04N 1/2369* (2013.01); *H04N 1/2376* (2013.01); *H04N 2201/0094* (2013.01)

(58) Field of Classification Search
None
See application file for complete search history.

(56) References Cited

U.S. PATENT DOCUMENTS

| | | | | | |
|---|---|---|---|---|---|
| 2004/0196471 | A1* | 10/2004 | Hirai | .................. | G03G 15/5087 358/1.1 |
| 2005/0012953 | A1* | 1/2005 | Fujishige | ........... | H04N 1/00204 358/1.13 |
| 2007/0091381 | A1* | 4/2007 | Sato | .................... | H04N 1/00326 358/448 |
| 2007/0192335 | A1* | 8/2007 | Sugiura | ............. | G06F 17/30725 |
| 2007/0283293 | A1* | 12/2007 | Nakamura | ............ | G06F 3/1211 715/811 |
| 2008/0218776 | A1* | 9/2008 | Takami | ................. | G06F 3/1205 358/1.6 |
| 2009/0208141 | A1* | 8/2009 | Kubo | ................. | H04N 1/00212 382/312 |

FOREIGN PATENT DOCUMENTS

JP 4625343 11/2010

* cited by examiner

*Primary Examiner* — Huo Long Chen
(74) *Attorney, Agent, or Firm* — Harness, Dickey & Pierce, P.L.C.

(57) ABSTRACT

An image processing apparatus includes: an image input unit configured to input image data; one or more applications configured to process the image data that has been input by the image input unit; an analysis unit configured to analyze a characteristic of the input image data; and a processing selection unit configured to select one or more of the applications suitable for processing the input image data, based on an analysis result obtained by the analysis unit.

16 Claims, 9 Drawing Sheets

SELECTION CONDITION

| INPUT CONTROL UNIT | POSITION | CHARACTERISTIC | APPLICATION |
|---|---|---|---|
| ... | ... | ... | ... |
| IMAGE READING CONTROL UNIT | UPPER LEFT | TWO-DIMENSIONAL CODE | SLIP READING APPLICATION |
| IMAGE READING CONTROL UNIT | ... | ... | ... |
| ... | ... | ... | ... |
| FAX RECEPTION CONTROL UNIT | ... | ... | ... |
| ... | ... | ... | ... |
| NETWORK COMMUNICATION CONTROL UNIT | ... | ... | ... |
| ... | ... | ... | ... |
| ... | ... | ... | COPY APPLICATION |
| ... | ... | ... | ... |
| ... | ... | ... | MAIL TRANSMISSION APPLICATION |
| ... | ... | ... | ... |

IMAGE PROCESSING APPARATUS, IMAGE PROCESSING METHOD, AND PROGRAM

CROSS-REFERENCE TO RELATED APPLICATION(S)

The present application claims priority to and incorporates by reference the entire contents of Japanese Patent Application No. 2014-249158 filed in Japan on Dec. 9, 2014 and Japanese Patent Application No. 2015-203086 filed in Japan on Oct. 14, 2015.

BACKGROUND OF THE INVENTION

1. Field of the Invention

The present invention relates to an image processing apparatus, an image processing method, and a program.

2. Description of the Related Art

In recent years, there has been an image processing apparatus equipped with a plurality of image processing applications. The image processing apparatus like this includes a means to be used by a user to select an image processing application. By using the means, the user selects, at image processing, an image processing application according to a purpose.

However, an increase in the number of image processing applications included in an image processing apparatus causes a problem including difficulties for the user to search for a desired image processing application and thus prolonged time for the search.

Japanese Patent No. 4625343 discloses a related art.

In view of the above, there is a need to provide an image processing apparatus, an image processing method, and a computer program product for assisting selection of the image processing application according to the purpose of image processing.

SUMMARY OF THE INVENTION

It is an object of the present invention to at least partially solve the problems in the conventional technology.

An image processing apparatus includes: an image input unit configured to input image data; one or more applications configured to process the image data that has been input by the image input unit; an analysis unit configured to analyze a characteristic of the input image data; and a processing selection unit configured to select one or more of the applications suitable for processing the input image data, based on an analysis result obtained by the analysis unit.

An image processing method is executed in an image processing apparatus having one or more applications configured to process image data. The image processing method includes: inputting image data; analyzing a characteristic of the input image data, and selecting one or more of the applications suitable for processing the input image data, based on an analysis result obtained by the analysis step.

A computer program product includes a non-transitory computer-readable medium containing an information processing program. The program causes a computer having one or more applications configured to process image data to perform: analyzing a characteristic of input image data; and selecting one or more of the applications suitable for processing the input image data, based on an analysis result of the analysis step.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments of an image processing apparatus, an image processing method, and a program according to the present invention will be described with reference to accompanying drawings. Hereinafter, an image processing apparatus according to the present invention will be described using an example of a case where being applied to a multifunction peripheral (MFP). It is not, however, limited to this application, but can be applied to any of image processing apparatuses including a copy apparatus, a printer, a scanner apparatus, and a fax apparatus. The multifunction peripheral is an apparatus having at least two of functions selected from a group consisting of a printer function, a copy function, a scanner function and a fax function.

Figure 1:
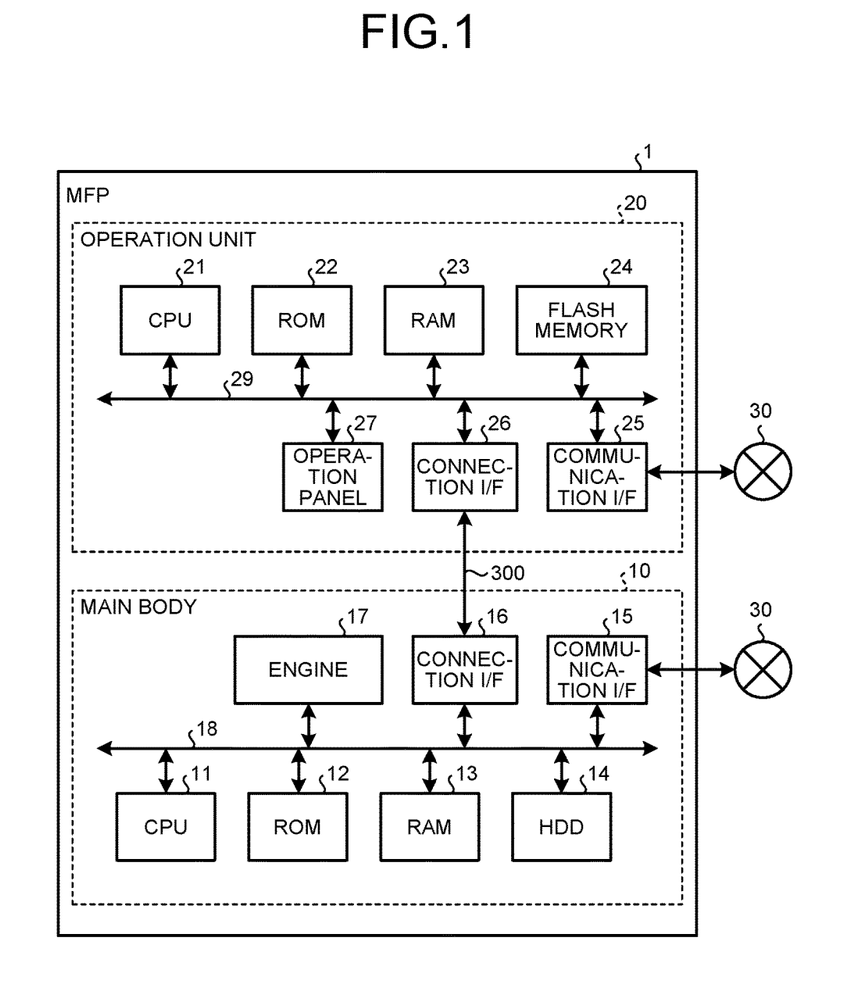
FIG. 1 is a diagram illustrating an exemplary hardware configuration of an MFP according to an embodiment.

FIG. 1 is a block diagram illustrating an exemplary hardware configuration of an MFP 1 according to the present embodiment. As illustrated in FIG. 1, the MFP 1 includes a main body 10 and an operation unit 20. The main body 10 implements various kinds of functions including the copy function, the scanner function, the fax function, and the printer function. The operation unit 20 receives an input corresponding to user's operation. The main body 10 and the operation unit 20 are communicatively connected with each other via a dedicated communication path 300. The communication path 300 may use, for example, an item compatible with the universal serial bus (USB) standard or any other standard regardless of wired or wireless.

The main body 10 can perform operation corresponding to the operation received at the operation unit 20. The main body 10 can also communicate with an external device such as a client personal computer (PC) and can operate corresponding to an instruction received from the external device.

First, a hardware configuration of the main body 10 will be described. As illustrated in FIG. 1, the main body 10 includes a CPU 11, ROM 12, RAM 13, a hard disk drive (HDD) 14, a communication interface (I/F) 15, a connection interface (I/F) 16, and an engine 17. These are connected with each other via a system bus 18.

The CPU 11 integrally controls operation of the main body 10. The CPU 11, using the RAM 13 as a working area (operation region), executes a program stored in the ROM 12, the HDD 14, or the like, thereby controlling overall operation of the main body 10 and implementing various kinds of functions including the above-described copy function, scanner function, fax function, and printer function.

The communication I/F 15 is an interface for connecting with a network 30. The connection I/F 16 is an interface for communicating with the operation unit 20 via the communication path 300.

The engine 17 is hardware configured to perform processing other than general information processing and communication so as to achieve the copy function, the scanner function, the fax function, and the printer function. For example, the engine 17 is equipped with a scanner (image reading unit) for scanning a document image, a printer (image forming unit) for printing to a sheet material such as paper, and a fax for performing fax communication, or the like. The engine 17 may further include specific options such as a finisher for sorting printed sheet materials and an automatic document feeder (ADF) for automatically feeding documents.

Next, a hardware configuration of the operation unit 20 will be described. As illustrated in FIG. 1, the operation unit 20 includes a CPU 21, ROM 22, RAM 23, flash memory 24, a communication interface I/F 25, a connection interface (I/F) 26, and an operation panel 27. These are connected with each other via a system bus 29.

The CPU 21 integrally controls operation of the operation unit 20. The CPU 12, using the RAM 23 as a working area (operation region), executes a program stored in the ROM 22, the flash memory 24, or the like, thereby controlling overall operation of the operation unit 20 and implementing various kinds of functions to be described below, including displaying information (image) corresponding to input received from a user. The ROM 22 and the flash memory 24 are exemplary storage units.

The communication I/F 25 is an interface for connecting with the network 30. The connection I/F 26 is an interface for communicating with the main body 10 via the communication path 300.

The operation panel 27 receives various kinds of input corresponding to user's operation and also displays various kinds of information (for example, information corresponding to operation received, information indicating operation status of the MFP 1, and information indicating a setting state) and is an exemplary operation unit. In this example, the operation panel 27 is configured with a liquid crystal display (LCD) equipped with a touch panel function, but is not limited to this. For example, it may be configured with an organic EL display apparatus equipped with a touch panel function. Furthermore, it is possible, in addition to this, or in place of this, to include an operation unit such as a hardware key and a display unit such as a lamp.

Figure 2:
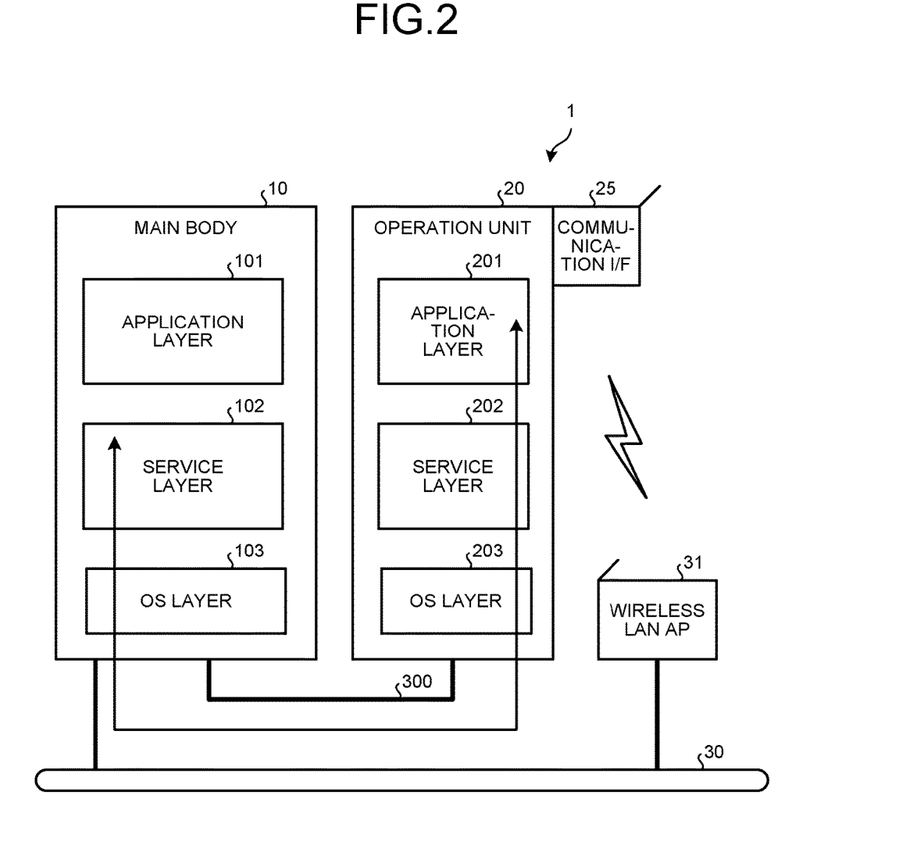
FIG. 2 is a diagram illustrating an exemplary software configuration of the MFP according to an embodiment.

Next, a software configuration of the MFP 1 will be described. FIG. 2 is a schematic diagram illustrating an exemplary software configuration of the MFP 1. As illustrated in FIG. 2, the main body 10 includes an application layer 101, a service layer 102, and an OS layer 103. The application layer 101, the service layer 102, and the OS layer 103, in reality, are various kinds of software stored in the ROM 12, the HDD 14, or the like. Various kinds of functions are provided when the CPU 11 executes these various kinds of software.

Software of the application layer 101 is software for providing a predetermined function by operating hardware resources and is referred to application software (hereinafter, also referred to simply as an "application"). Examples of applications include a copy application for providing a copy function, a scanner application for providing a scanner function, a fax application for providing a fax function, and a printer application for providing a printer function.

Software of the service layer 102 exists between the application layer 101 and the OS layer 103, and is software for providing, to the application, an interface for utilizing hardware resources included in the main body 10. More specifically, the software of the service layer 102 is software for providing functions of performing reception of operation requirements for hardware resources, and for performing mediation of the operation requirements. The operation requirements received by the service layer 102 may include requirements such as reading by a scanner and printing by a printer.

An interface function achieved by the service layer 102 is provided also for an application layer 201 of the operation unit 20 as well as for the application layer 101 of the main body 10. In other words, also the application layer 201 (application) of the operation unit 20 is also capable of achieving a function that utilizes hardware resources (the engine 17, for example) of the main body 10, via an interface function of the service layer 102.

The software of the OS layer 103 is basic software (operating system) for providing basic functions to control hardware included in the main body 10. The software of the service layer 102 converts usage requirements of the hardware resources from various kinds of applications into commands interpretable to the OS layer 103 and passes them to the OS layer 103. Subsequently, the commands are executed by the software of the OS layer 103, and thus the hardware resources operate according to the requirements from the applications.

In a similar manner, the operation unit 20 includes the application layer 201, a service layer 202, and an OS layer 203. A layer structure of each of the application layer 201, the service layer 202, and the OS layer 203, included in the operation unit 20, is similar to the layer structure on the main body 10. Note that functions provided by the application of the application layer 201 and the kinds of operation requirements receivable by the service layer 202 are different from those on the main body 10. The application of the application layer 201 may be software for providing predetermined functions by operating hardware resources included in the operation unit 20. The application of the application layer 201, however, is principally the software for providing user interface (UI) functions for performing operation and display related to functions (copy function, scanner function, fax function, and printer function) included in the main body 10.

According to the present embodiment, in order to maintain independence of functions, the software of the OS layer 103 on the main body 10 and the software of the OS layer 203 on the operation unit 20 are configured to differ from each other. In other words, the main body 10 and the operation unit 20 operate independently from each other on independent operating systems. For example, it is possible to use Linux (registered trademark) as software for the OS layer 103 on the main body 10, and to use Android (registered trademark) as software for the OS layer 203 on the operation unit 20.

As described above, the MFP 1 according to the present embodiment is configured such that the main body 10 and the operation unit 20 operate on separate operating systems. Accordingly, communication between the main body 10 and the operation unit 20 is performed not as inter-process communication in a common apparatus, but as communication between different apparatuses. This communication includes operation (command communication) of transmitting information received by the operation unit 20 (what has been instructed by a user) to the main body 10 and operation of the main body 10 to notify the operation unit 20 of events. Herein, the operation unit 20 performs command communication to the main body 10, making it possible to use functions of the main body 10. The events notified by the main body 10 to the operation unit 20 include an operation execution status at the main body 10, and what has been set on the main body 10.

Moreover, according to the present embodiment, power to the operation unit 20 is supplied from the main body 10 via the communication path 300. This configuration enables power source control for the operation unit 20 separately (independently) from the power source control for the main body 10.

In this example, the main body 10 and the operation unit 20 are electrically and physically connected via the communication path 300. Alternatively, the operation unit 20 may be configured to be removable from the main body 10. In this case, each of the main body 10 and the operation unit 20 may include, for example, a short-distance wireless communication unit such as an infrared communication unit, a radio frequency (RF) communication unit, and a Bluetooth (registered trademark) communication unit. Alternatively, it is possible to provide a wireless LAN communication function such as Wi-Fi (registered trademark) to each of the main body 10 and the operation unit 20 so as to enable mutual communication, as illustrated in FIG. 2, via a wireless LAN access point (wireless LAN AP) 31 and the network 30. LAN is an abbreviation of "local area network". When the operation unit 20 is removable from the main body 10, the operation unit 20 stores power supplied from the main body 10 via the communication path 300, in a secondary battery. The operation unit 20, when removed from the main body 10, operates and communicates with the main body 10 by using the power stored in the secondary battery.

Figure 3:
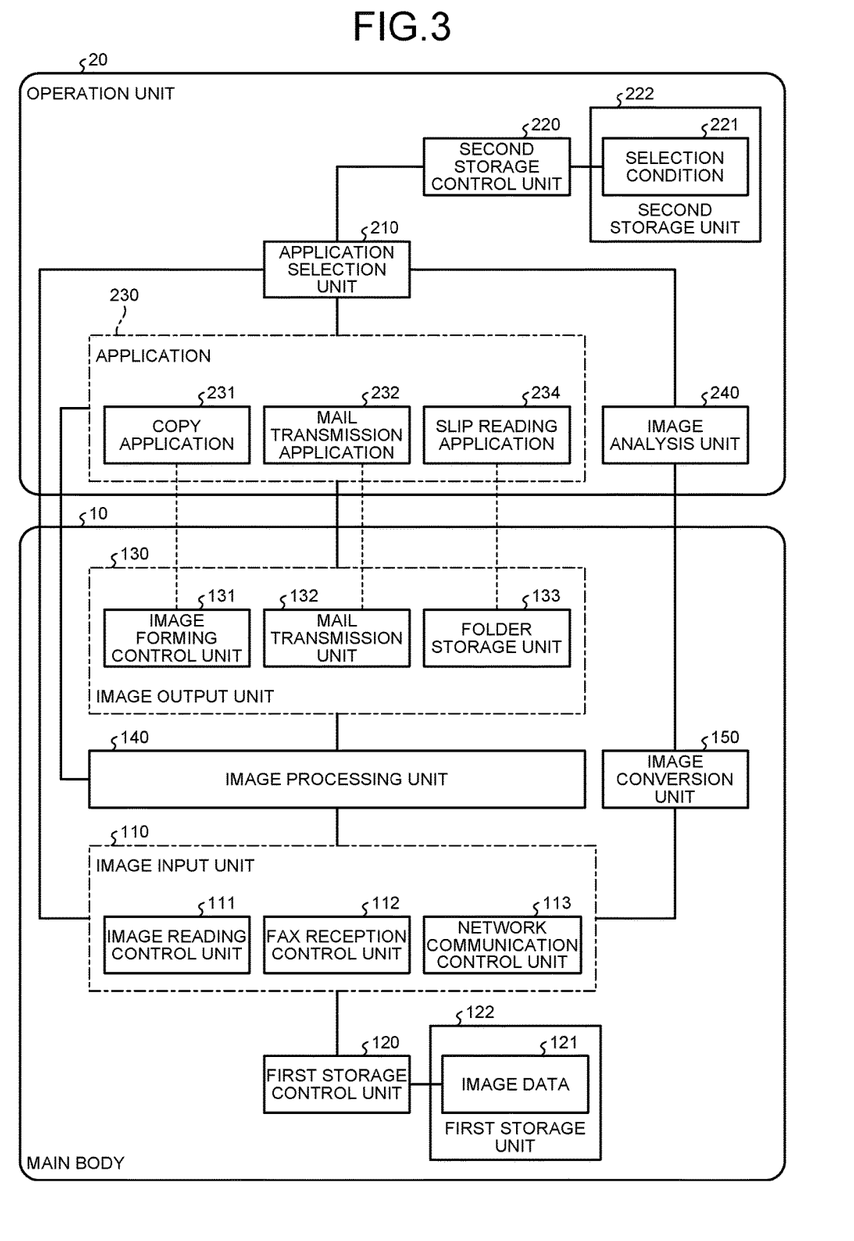
FIG. 3 is a diagram illustrating an exemplary functional configuration of the MFP according to an embodiment.

FIG. 3 is a diagram illustrating an exemplary functional configuration of the MFP 1. As illustrated in FIG. 3, the main body 10 includes an image input unit 110, a first storage control unit 120, an image output unit 130, an image processing unit 140, and an image conversion unit (conversion unit) 150. The operation unit 20 includes an application selection unit (processing selection unit) 210, a second storage control unit 220, an application 230, and an image analysis unit (analysis unit) 240.

The image input unit 110 includes one or more input control units configured to control image data input. Specific examples of the input control unit include an image reading control unit 111, a fax reception control unit 112, and a network communication control unit 113. The image input unit 110 obtains image data via any of the image reading control unit 111, the fax reception control unit 112, and the network communication control unit 113. Subsequently, the first storage control unit 120 causes a first storage unit 122 to store the image data 121 obtained by the image input unit 110. Herein, the first storage unit 122 is the HDD 14, for example. Here, input of the image data 121 can be achieved by the image input unit 110.

The image reading control unit 111 controls a scanner included in the engine 17 and inputs image data. The scanner receives light that has been emitted to an image and then reflected on the image, and generates image data based on the image. The fax reception control unit 112 controls a fax included in the engine 17 and inputs the image data. The fax receives, via a telephone line, a signal generated based on the image data. The network communication control unit 113 receives image data from another computer, or the like, connected with the network 30, via (by controlling) the communication interface (I/F) 15.

The CPU 11 reads a program from the ROM 12 and executes the program, whereby the image reading control unit 111, the fax reception control unit 112, and the network communication control unit 113 are loaded onto a main storage device. Accordingly, the image reading control unit 111, the fax reception control unit 112, and the network communication control unit 113 are generated on the main storage device. Alternatively, a part of or the entire image reading control unit 111, the fax reception control unit 112, and the network communication control unit 113 may be implemented by a hardware circuit.

The image output unit 130 includes an image forming control unit 131, a mail transmission unit 132, and a folder storage unit 133. Through these units, the image output unit 130 outputs an image or image data. The image forming control unit 131 prints an image reconstructed based on the image data. The mail transmission unit 132 transmits a mail to which image data is attached, to a predetermined destination. The folder storage unit 133 stores image data in a predetermined storage unit according to a predetermined rule (obtained from the corresponding application 230). This storage unit is, for example, a file server 2 (FIG. 5) to be described below.

The image processing unit 140 exists between the image input unit 110 and the image output unit 130. The image processing unit 140 processes the image data that has been input by the image input unit 110, according to an output format of the image output unit 130, At this time, the image processing unit 140 follows an instruction from the application 230.

Examples of image processing applied to the image data by the image processing unit 140 include magnification, reduction, binarization, and rotation. Which processing is to be performed may be predetermined, for example, for each of the application 230, or may be received as an argument of a requirement from the application 230.

The image conversion unit 150 exists between the image input unit 110 and the image analysis unit 240. The image conversion unit 150 converts the image data that has been input by the image input unit 110 into a state that meets a predetermined requirement, and passes it to the image analysis unit 240.

Herein, the main body 10 and the operation unit 20 are connected to each other via the communication path 300. The communication path 300, for example, uses a USB connection. In this case, if an image data size is too large, it may affect processing performance. To avoid this, the image conversion unit 150 performs conversion on the image data in order to decrease the image data size. Examples of conversion include decreasing resolution of an image, compressing the image data, and cutting out a necessary image region.

The operation unit 20 includes one or more applications 230. Examples of the applications 230 include a copy application 231, a mail transmission application 232, and a slip reading application 234. Each of the applications 230 processes the image data that has been input by the image input unit 110, according to a purpose. The copy application 231 causes the image forming control unit 131 to output an image based on image data. The mail transmission application 232 causes the mail transmission unit 132 to transmit a mail with which image data is attached. The slip reading application 234, when the image data is slip data, causes the folder storage unit 133 to store the image data in a predetermined storage unit.

The application selection unit 210 selects one or more applications 230 that are suitable for image data processing from among the applications 230. The application selection unit 210 performs this selection of application 230 based on a selection condition 221. The second storage control unit 220 stores the selection condition 221 in advance, for example, as a database table (refer to FIG. 4) in a second storage unit 222. Herein, the second storage unit 222 may be the flash memory 24, or the like.

Figure 4:
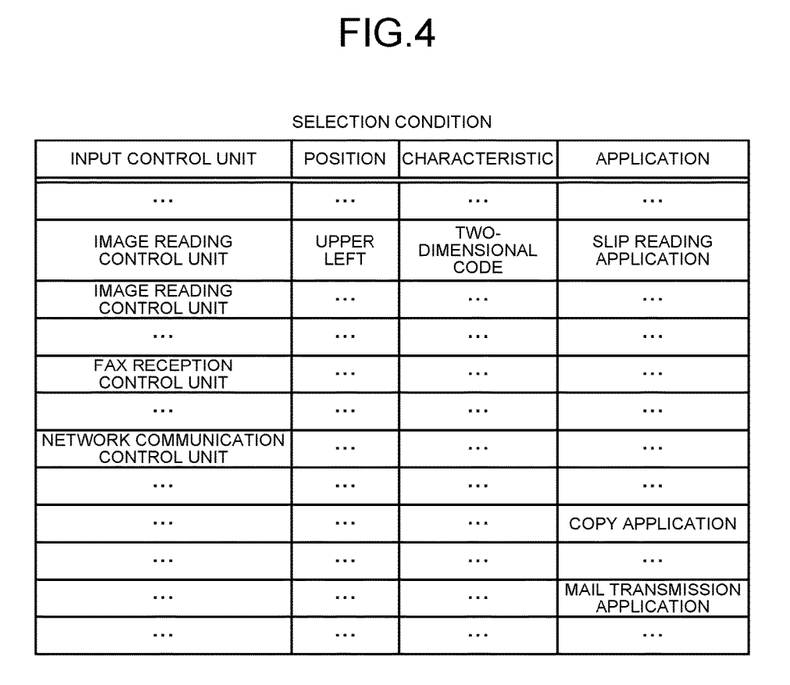
FIG. 4 is an exemplary selection condition according to an embodiment and is a diagram illustrating a table to be used as the selection condition.

FIG. 4 is an exemplary selection condition 221 and is a diagram illustrating a table to be used as the selection condition 221. The selection condition 221 stores a key occurrence for selection in association with the application 230 to be selected. The above-described occurrence represents one or both of the input control unit that has controlled image data input, and a characteristic of the image data. Specific examples of characteristics of the image data include a one-dimensional code and a two-dimensional code. Examples of the one-dimensional code include a JAN code, a European Article Number (EAN) code, and a Universal Product Code (UPC). Examples of the two-dimensional code include a QR code (registered trademark) and a CP code.

The image analysis unit 240 analyzes the characteristic of the image data to be a key in a selection by the application selection unit 210 and outputs an analysis result. Specific example of the analysis, may be an analysis to determine whether there is a two-dimensional code at a predetermined position on an image to be reconfigured by the image data.

Figure 5:
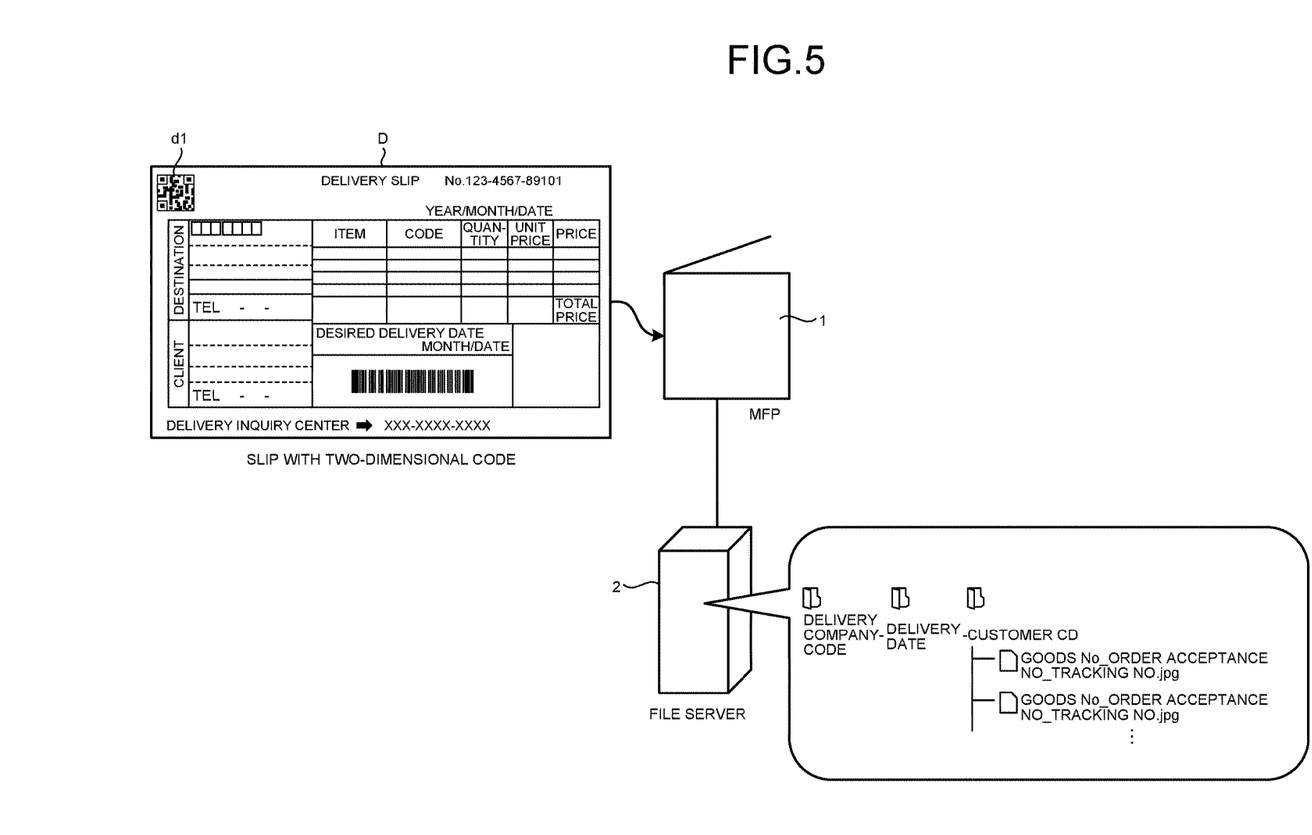
FIG. 5 is a diagram illustrating a concept of slip reading using the MFP according to an embodiment.

FIG. 5 is a diagram illustrating a concept of slip reading using the MFP 1. Herein, the slip reading is a series of operation from operation in which the MFP 1 reads a slip D and obtains image data to operation in which the file server 2 stores the image data into a predetermined folder.

The slip D has a characteristic of including a two-dimensional code at a predetermined position (document's upper-left position d1 in FIG. 5). If a two-dimensional code exists at a predetermined position (document's upper-left position d1) on the image data obtained by reading the slip, the MFP 1 recognizes that the document of the image data is the slip D. The file server 2 stores the image data in a predetermined folder.

Figure 6:
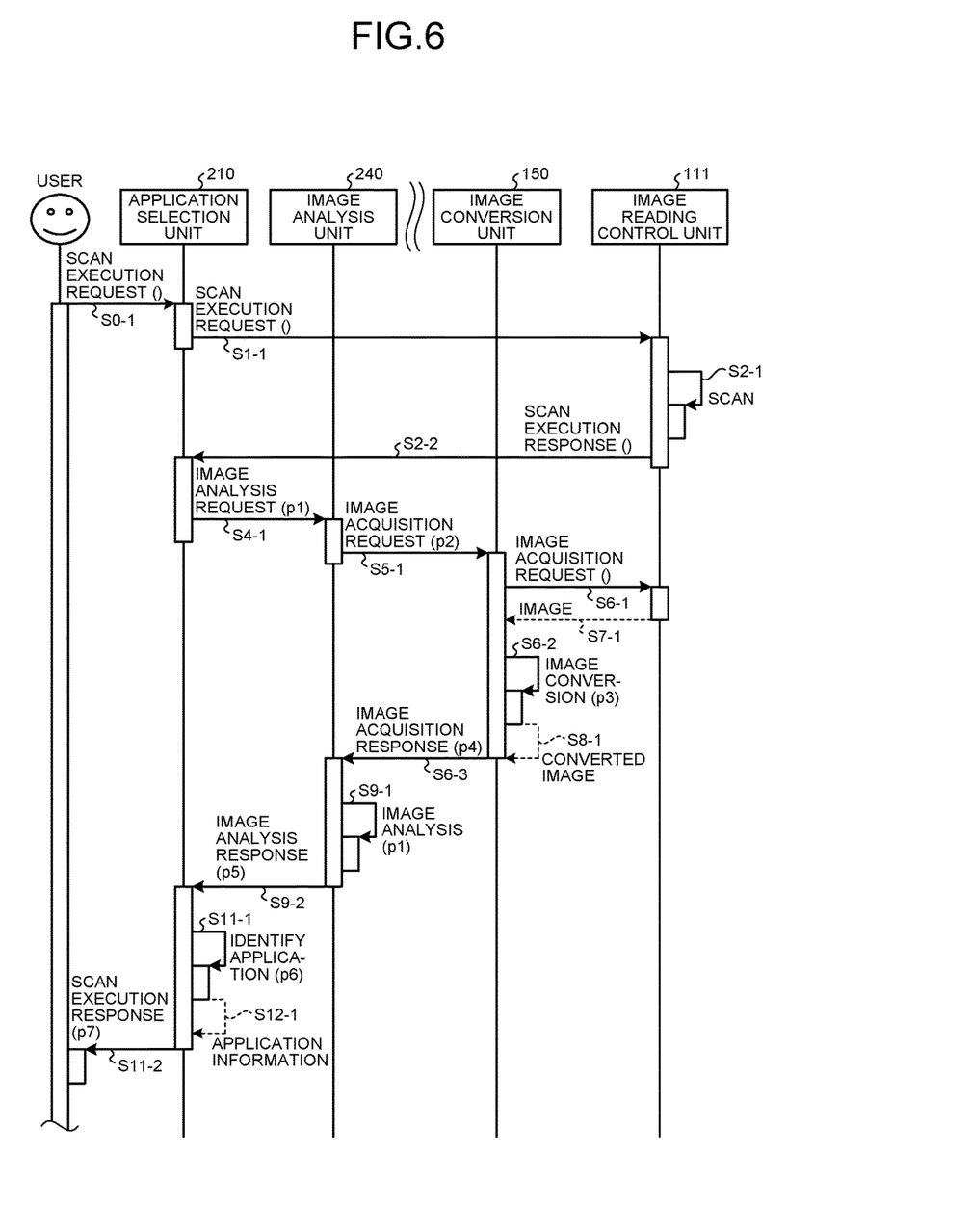
FIG. 6 is a sequence diagram sequentially illustrating, in time sequence, operation of each of units related to a first half of slip reading according to an embodiment.

Next, operation of individual units related to the above-described slip reading will be described in time sequence. FIG. 6 is a sequence diagram illustrating, in time sequence, operation of each of units related to a first half of slip reading.

First, a user sets a document on the image reading control unit 111, and operates the operation panel 27, thereby requesting the MFP 1 to execute a scan. The operation panel 27 receives the user's operation and transmits a signal corresponding to the operation to the application selection unit 210.

The application selection unit 210 receives the signal emitted from the operation panel 27 that has received the above-described user's operation, as a scan execution request (step S0-1). The application selection unit 210 subsequently transmits a scan execution request (step S1-1) to the image reading control unit 111.

The image reading control unit 111 receives the above-described scan execution request (step S1-1) and then executes a scan (step S2-1). Next, the image reading control unit 111 causes the first storage control unit 120 to store the image data 121 obtained by executing scanning in the first storage unit 122. The image reading control unit 111 subsequently transmits a scan execution response (step S2-2) to the application selection unit 210.

The application selection unit 210 receives the above-described scan execution response (step S2-2) and then transmits an image analysis request (step S4-1) to the image analysis unit 240. At this time, the application selection unit 210 adds an argument p1 to the image analysis request (step S4-1). The argument p1 is, for example, is the selection condition 221 of an application. The application selection unit 210 obtains, at a predetermined timing, the selection condition 221 from the second storage unit 222 via the second storage control unit 220.

The selection condition 221 may be, for example, "to use a slip reading application 234 in a case where a two-dimensional code exists at an upper-left position of an image that has been input by the image reading control unit 111". In this case, the image reading control unit 111 in the above-described example of the selection condition 221 is namely the above-described "input control unit that has controlled image data input". Moreover, existence of the two-dimensional code on an upper left on the image is the "characteristic of the image data".

The argument p1 is a selection condition 221 to be added to the image analysis request (step S4-1) based on the scan execution response (step S2-2) from the image reading control unit 111. Accordingly, the application selection unit 210 determines, from among the selection condition 221, one that is at least associated with the case in which the input control unit that has controlled image data input is the image reading control unit 111, to be the argument p1.

The image analysis unit 240 receives the image analysis request (step S4-1) and then transmits an image acquisition request (step S5-1) to the image conversion unit 150. At this time, the image analysis unit 240 adds an argument p2 to the image acquisition request (step S5-1).

The argument p2 may be that the input control unit that has controlled image data input is the image reading control unit 111, may be region information, and an image parameter. The region information is, for example, an area minimum required for analysis and its position, (for example, "upper-left position on the image"). The image parameter (specific image) may be, for example, image resolution and a mark as a key (for example, a "two-dimensional code"). The region information and the image parameter are stored in the second storage unit 222 as the selection condition 221. The argument p2 is configured based on the argument p1. That is, the argument p1 also includes the region information and the image parameter.

The image conversion unit 150 receives the image acquisition request (step S5-1) and then transmits an image acquisition request (step S6-1) to the image reading control unit 111. The image reading control unit 111 receives the image acquisition request (step S6-1), obtains the image data 121 from the first storage unit 122 via the first storage control unit 120, transmits the image data 121 to the image conversion unit 150 (step S7-1).

The image conversion unit 150 obtains the image data 121 and then performs image conversion (step S6-2). An argument p3 added to the image conversion (step S6-2) may be the above-described region information and the image parameter, which are a part of the argument p2, and the image data 121. The image conversion unit 150 converts the image data 121 to a suitable state based on the argument p3.

The image conversion unit 150 obtains the image data by image conversion (step S8-1), and transmits an image acquisition response (step S6-3) in which the image data is an argument p4, to the image analysis unit 240.

The image analysis unit 240 obtains the image data (after image conversion) and performs image analysis (step S9-1). The image analysis unit 240 adds the argument p1 to the image analysis (step S9-1). The argument p1 is what has been added to the image analysis request (step S4-1) transmitted from the application selection unit 210.

Specifically, the image analysis unit 240 analyzes whether there is a match between the characteristic of the image data stored in the selection condition 221 as the argument p1 and the characteristic of the input image data (after conversion). At this time, the image analysis unit 240 analyzes whether there is a match between the characteristic of the image data that has been stored, in the selection condition 221, in association with the input control unit that has controlled the input of input image data, and the characteristic of the input image data. The reason is that, as described in step 4-1, the argument 1 is a characteristic of the image data associated with the input control unit that has controlled image data input. In FIG. 6, the argument p1 is a characteristic of the image data associated with the image reading control unit 111. The image analysis unit 240 temporarily stores, for later use, the image data that has been the argument p4, in the RAM 23 or the like.

The image analysis unit 240 subsequently transmits an image analysis response (step S9-2) to the application selection unit 210. At this time, the image analysis unit 240 adds an argument p5 to the image analysis response (step S9-2). The argument p5 is, for example, a match condition. That is, an analysis result indicating that there is a match between the characteristic of the image data stored, in the selection condition 221, in association with the input control unit that has controlled input of the input image data, and the characteristic of the input image data, is the match condition. This match condition is transmitted as an image analysis response. A specific example of the match condition is that "a two-dimensional code exists in upper left on the image". Output of an analysis result obtained by the image analysis unit 240 is implemented in step S9-2. Note that step S9-2 is an example of analysis result output, therefore, implementation is not limited to this.

The application selection unit 210 receives the image analysis response (step S9-2) and then performs a process of identifying an application (step S11-1). That is, the application selection unit 210 selects one or more applications suitable for processing input image data based on an analysis result that there is a match between a characteristic of the image data stored, in the selection condition 221, in association with the input control unit that has controlled input of the input image data and the characteristic of the input image data, and based on the selection condition 221. The application selection unit 210 then adds an argument p6 to the process of identifying an application (step S11-1). The argument p6 is a target application. Examples of the target application include the slip reading application 234 and a scanner application (not illustrated). The scanner application functions as a general scanner (reading a document image and storing the obtained image data into a predetermined storage region). Accordingly, detailed description will be omitted.

Figure 7:
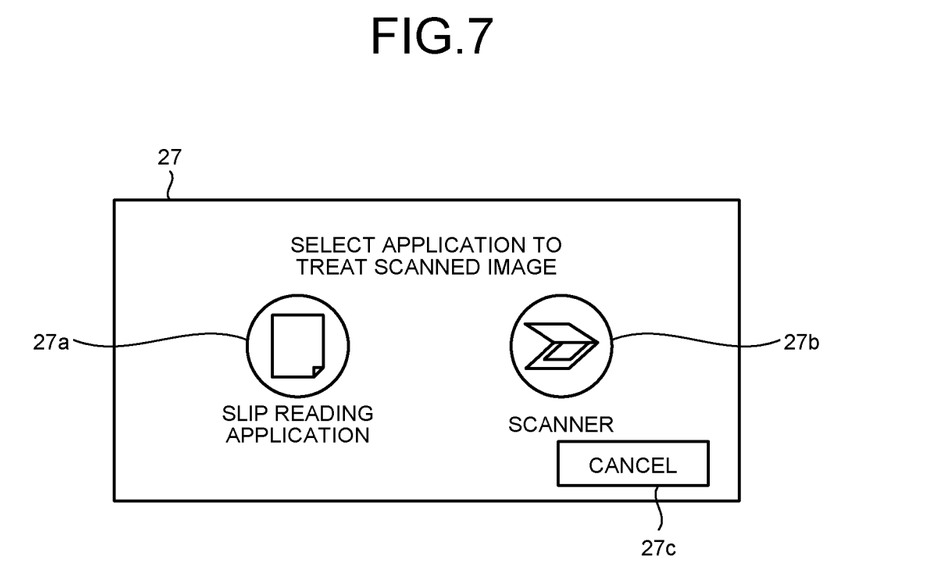
FIG. 7 is a diagram illustrating an exemplary screen an application selection unit displays on an operation panel according to an embodiment.

The application selection unit 210 returns application information (step S12-1) to the user as a scan execution response (step S11-2). The scan execution response (step S11-2) is executed by displaying a screen onto the operation panel 27. FIG. 7 is a diagram illustrating an exemplary screen (argument p7) that the application selection unit 210 causes the operation panel 27 to display.

The application selection unit 210 displays an application selection buttons 27a and 27b and a cancel button 27c on the operation panel 27, thereby requesting the user to perform final determination of the application 230 to be used for processing the image data 121. The application selection button 27a receives processing selection performed by the slip reading application 234. The application selection button 27b receives processing selection performed by the scanner application. The cancel button 27c receives a cancel request denoting that processing for the image data 121 is not to be executed.

Figure 8:
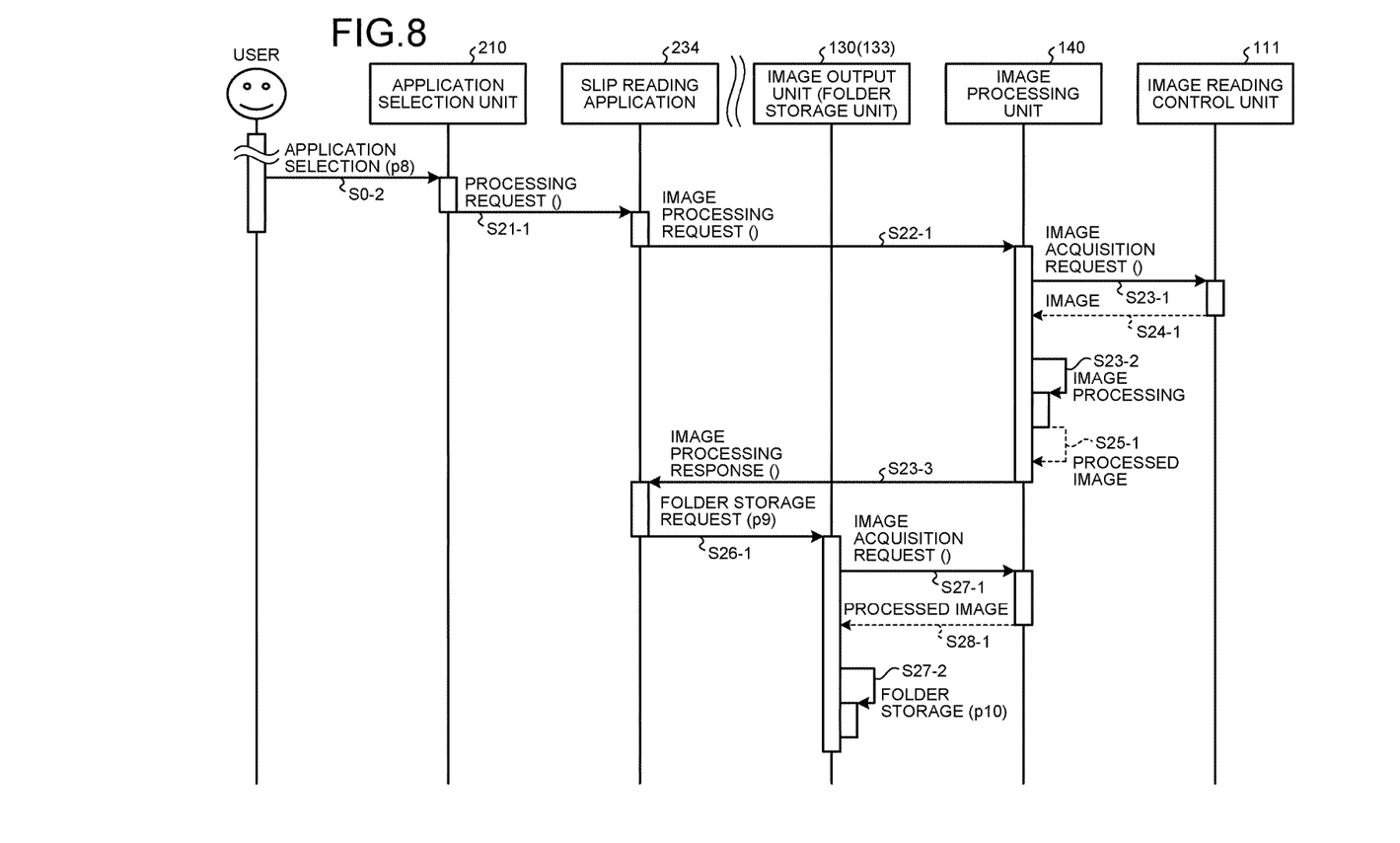
FIG. 8 is a sequence diagram illustrating, in time sequence, operation of each of units related to a latter half of the slip reading according to an embodiment.

FIG. 8 is a sequence diagram illustrating, in time sequence, operation of each of units related to a latter half of slip reading. When the user operates the application selection button 27a, the operation panel 27 emits a signal according to the operation. The signal is received by the application selection unit 210 as an application selection (step S0-2) signal. This application selection signal has an argument p8. The value of the argument p8 corresponds to the button operated by the user.

The application selection unit 210 receives the application selection (step S0-2) signal and then transmits a processing request (step S21-1) to the slip reading application 234. In response to this, the slip reading application 234 transmits an image processing request (step S22-1) to the image processing unit 140.

The image processing unit 140 receives the image processing request (step S22-1) and then transmits an image acquisition request (step S23-1) to the image reading control unit 111. In response to this, the image reading control unit 111 transmits the image data 121 (step S24-1) to the image processing unit 140.

The image processing unit 140 receives the image data 121 and then performs image processing (step S23-2). Next, the image processing unit 140 stores the image data obtained by image processing (step S25-1) in a predetermined storage region (for example, in the RAM 13). The image processing unit 140 then transmits an image processing response (step S23-3) to the slip reading application 234.

The slip reading application 234 receives the image processing response (step S23-3) and then transmits a folder storage request (step S26-1) to the folder storage unit 133. At this time, the slip reading application 234 adds an argument p9 to the folder storage request (step S26-1). Examples of the argument p9 include a storage directory of the image data and a file name of the image data.

Herein, the slip reading application 234 creates the above-described storage directory and the file name between steps S22-1 to S26-1. For creation of these, the slip reading application 234 first obtains image data from RAM 23, or the like. This image data is image data that has been the argument p4 in the image acquisition response (step S6-3), and has been stored by the image analysis unit 240.

Next, the slip reading application 234 confirms what is included in a two-dimensional code included in the image data. The two-dimensional code includes information such as "delivery company code", "delivery date", "customer CD", "goods No.", "order acceptance No.", and "tracking No.". Using this information, the slip reading application 234 initially defines the storage directory as, for example, "[delivery company code]¥[delivery date]¥[customer CD]". Moreover, the slip reading application 234 defines the file name as, for example, "[goods No.]¥[order acceptance No.]¥[tracking No.]".

The folder storage unit 133 receives the folder storage request (step S26-1) and then transmits image acquisition request (step S27-1) to the image processing unit 140. The image processing unit 140 receives the image acquisition request (step S27-1) and then transmits the processed image data that has been stored in a predetermined storage region, to the folder storage unit 133 (step S28-1).

The folder storage unit 133 receives the processed image data and stores the image data (an argument p10) in a predetermined folder (step S27-2).

Figure 9:
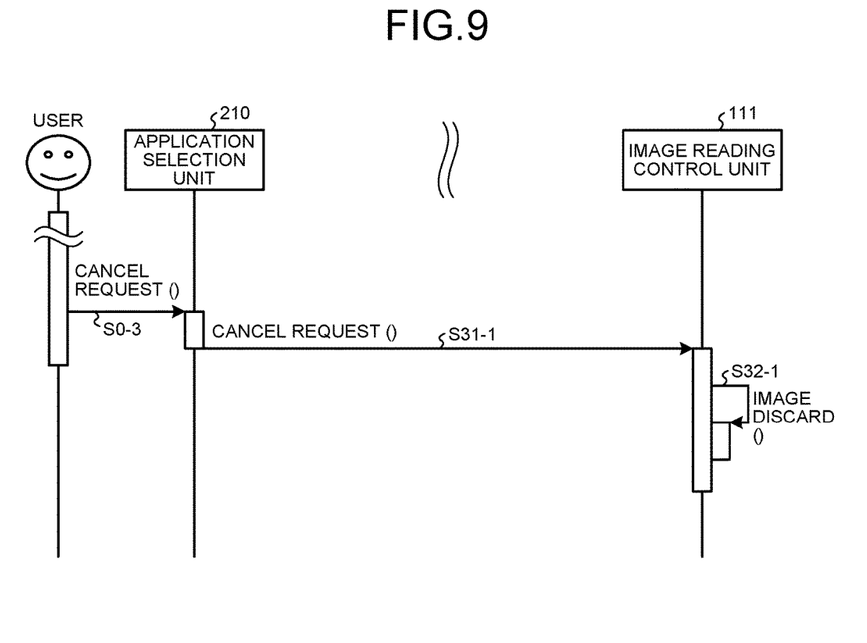
FIG. 9 is a sequence diagram illustrating operation of each of units when a user selects a cancel button according to an embodiment.

FIG. 9 is a sequence diagram illustrating operation of each of units when a user selects a cancel button 27c (FIG. 7). When the user selects the cancel button 27c, the application selection unit 210 determines that a cancel request (step S0-3) has been received from the user and transmits a cancel request (step S31-1) to the image reading control unit 111. Subsequently, when the cancel request is received, the application selection unit 210 does not execute processing of the image data 121. Accordingly, the image reading control unit 111 performs an image discard (step S32-1).

As described above, according to the present embodiment, at the time of implementation of image input processing, the image processing apparatus automatically narrows down applications to specific applications that are likely to process the image based on information such as an image input unit and an input image. The image processing apparatus, then, automatically selects an application suitable for processing, and proposes the application for use to the user. With this configuration, even when the image processing apparatus includes a plurality of applications that utilizes image input processing, it is possible to reduce a labor on the user for selecting applications and to solve the problem of taking a long time for the user in searching for desired applications. Therefore, according to the present embodiments, it is possible to simplify selection of application suitable for the purpose of image processing. Accordingly, the user can easily cause the MFP 1 to execute image processing according to the specific purpose.

In addition, determining the selection condition 221 in advance enables the application selection unit 210 to select, with high accuracy, an application 230 suitable for treating, for example, an image that has a specific characteristic.

Furthermore, the image conversion unit 150 converts the image data according to the specific purpose and provides the image data to the image analysis unit 240, thereby enabling improving image analysis efficiency (accuracy and performance including speed).

According to the present embodiments, it is configured that the application selection unit 210, when it has selected a plurality of application 230, presents the plurality of applications 230 to the user as options. Thus, the application 230 that executes processing of the image data 121 is determined according to user's selection. With this configuration, the user can determine a suitable application when the plurality of application 230 has been left as options. This enhances convenience for the user.

Furthermore, according to the present embodiment, it is configured that, after selection of the application 230, the application selection unit 210 causes the application 230 to execute processing image data 121 when there is no disapproval on the user. In other words, it is configured that the processing is not to be executed when there is disapproval on the user. Alternatively, it is configured that the processing is to be executed when there is approval on the user. With this configuration, if there is no application 230 that the user really wants to use among the automatically selected applications 230, the user can stop the processing. This can prevent inconvenience such as execution of unnecessary processing.

In the above-described embodiment, selection of the application 230 is performed not only with reference to the characteristic of the image data but also with reference to the input control unit that has controlled input of the image data. Actual implementation of selection of the application 230 is not limited to this configuration. In other words, it is possible to configure such that the application 230 may be selected not with reference to the input control unit that has controlled input of the image data but may be selected only with reference to the characteristic of the image data. In this case, for example, it is to be configured such that, regardless of which input control unit is used for inputting the image data, the application selection unit 210 determines to select a slip reading application in a case where the analysis result has included a message that a two-dimensional code exists at a predetermined position.

In the description, an example of the first storage unit 122 that stores the image data 121 obtained by the image input unit 110 is the HDD 14. However, it is not limited to this example in implementation. For example, a server provided separately from the main body 10 may be determined as the first storage unit 122.

Moreover, the image forming control unit 131 may perform printing control to a plotter, not printing control to the printer. Furthermore, the image processing unit 140 may store the image data that has undergone image processing, by using a storage region other than the RAM 13.

The second storage control unit 220 may store the selection condition 221 in a form other than a database table, in the second storage unit 222. Furthermore, it is possible to provide the second storage unit 222 that stores the selection condition 221 by using a storage other than the flash memory 24.

The program executed in the image processing apparatus according to the above-described embodiment is provided by being incorporated in ROM, or the like, in advance.

The configuration may be such that the program to be executed in the image processing apparatus according to the above-described embodiment is provided as a file that has an installable or executable format, being recorded in a computer-readable recording medium. Examples of the recording medium include a CD-ROM, a flexible disk (FD), a CD-R, a digital versatile disk (DVD), a compact disk (CD), a SD memory card, and a Universal Serial Bus (USB) memory.

Furthermore, the configuration may be such that the program to be executed in the image processing apparatus according to the above-described embodiment is stored in a computer being connected to a network such as an Internet, and is provided by being downloaded via the network. Furthermore, the configuration may be such that the program to be executed in the image processing apparatus according to the above-described embodiment is provided or delivered via the network such as the Internet.

The program to be executed in the image processing apparatus according to the above-described embodiment has a module configuration including the above-described units (the image input unit 110, the first storage control unit 120, the image output unit 130, the image processing unit 140, the image conversion unit 150, the application selection unit 210, the second storage control unit 220, the application 230, and the image analysis unit 240). As actual hardware, the CPU (processor) reads the program from the above-described ROM and executes the program, whereby the above-described individual units are loaded onto the main storage device. Accordingly, the image input unit 110, the first storage control unit 120, the image output unit 130, the image processing unit 140, the image conversion unit 150, the application selection unit 210, the second storage control unit 220, the application 230, and the image analysis unit 240 are generated on the main storage device.

Furthermore, the part of or entire above-described units (the image input unit 110, the first storage control unit 120, the image output unit 130, the image processing unit 140, the image conversion unit 150, the application selection unit 210, the second storage control unit 220, the application 230, and the image analysis unit 240) may be provided as a hardware circuit.

In the example of the above-described embodiment, the image processing apparatus according to the present invention has been applied to a multifunction peripheral that has at least two functions selected from a group consisting of a copy function, printer function, scanner function, and a fax function. However, the apparatus can be applied to any apparatus that is an image processing apparatus such as a copy apparatus, a printer, a scanner apparatus, and a fax apparatus.

According to an embodiment, it is possible to provide an effect that selection of an image processing application suitable for each purpose of image processing can be simplified.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An image processing apparatus, comprising:
a main body including:
a scanner;
a first memory storing a first operating system (OS) program; and
a first processor configured to, by executing the first OS program, control the scanner to scan a document and generate image data based on the scanned document;
an operation unit including:
a user interface including a display;
a second memory storing a second OS program and a plurality of application programs; and
a second processor configured to, by executing the second OS program,
send an instruction for scanning to the main body in response to a user operation via the user interface,
receive the generated image data from the main body,
analyze the generated image data,
based on the analyzing of the generated image data, identify one or more first application programs, from among the plurality of application programs, as being suitable for processing the generated image data,
display, on the display, a selection screen including the identified one or more first application programs, and
in response to receiving a selection of an application program to be executed among the identified one or more first application programs,
activate the selected application program by reading from the second memory to cause the selected application program to process the generated image data; and
first storage storing a plurality of selection conditions, each of the plurality of selection conditions identifying,
an input control device, from among a plurality of input control devices,
an image data characteristic, from among a plurality of image data characteristics, and
an application program, from among the plurality of application programs, to be enabled for selection when image data generated under control of the identified input control device is determined by the second processor to include the identified image data characteristic,
wherein the second processor is further configured to, by executing the second OS program, perform the analyzing based on the image data characteristic identified by at least one selection condition among the plurality of selection conditions stored in the first storage.

2. The image processing apparatus according to claim 1, wherein the second processor is further configured to, by executing the second OS program,
display the identified one or more first application programs as options and receive a selection of any of the options from a user, when one or more of the identified one or more first application programs have been selected, and
determine, as an application program to perform processing of the image data, an application program whose selection has been received from the user.

3. The image processing apparatus according to claim 2, wherein the second processor is further configured to, by executing the second OS program, display, as the options, the identified one or more first application programs and a cancel request denoting that processing for the image data is not to be executed, and
wherein the second processor is further configured to execute the second OS program such that, when the second processor has received a selection of the cancel request, the second processor does not execute processing of the image data.

4. The image processing apparatus according to claim 1, wherein the second processor is further configured to, by executing the second OS program,
store a first selection condition in the storage, the first selection condition identifying an association between a first image data characteristic from among the plurality of image data characteristics and at least one application program from among the plurality of application programs,
the second processor being configured to execute the second OS program such that the second processor performs the identifying of the one or more first application programs, from among the plurality of application programs, based on a result of the analyzing and the first selection condition.

5. The image processing apparatus according to claim 4, wherein the second processor is further configured to execute the second OS program such that, the analyzing of the generated image data includes determining whether there is a match between the first image data characteristic and a characteristic of the generated image data, and the identifying of the one or more first application programs includes identifying the one or more first application programs as suitable for processing the generated image data based on, a result of the analyzing of the generated image data indicating that there is a match between the first image data characteristic and the characteristic of the generated image data, and the first selection condition.

6. The image processing apparatus according to claim 5, wherein the operation unit further includes one or more input control devices configured to control input of image data, from among the plurality of input control devices, wherein the first selection condition identifies an association between at least a first input control device among the one or more input control devices, the first image data characteristic, and the at least one application program, and wherein the first input control device is an input control device that has controlled generation of the generated image data.

7. The image processing apparatus according to claim 6, wherein the second processor is further configured to, by executing the second OS program, convert the generated image data based on the first image data characteristic, and analyze a characteristic of the converted image data.

8. The image processing apparatus according to claim 7, wherein the second processor is further configured to execute the second OS program such that the converting of the generated image data includes converting the generated image data based on an image data characteristic that is identified, in the first selection condition, as being associated with the input control device that has controlled generation of the generated image data.

9. The image processing apparatus according to claim 6, wherein at least one of the one or more input control devices includes one or more of an image reading control device configured to control the scanner to generate image data, a fax reception control device configured to control a fax to generate image data, and a network communication control device configured to control a communication interface to generate image data.

10. The image processing apparatus according to claim 4, wherein the first image data characteristic is a characteristic indicating that at least a first image included in the generated image data is located at a specified position within a second image included in the generated image data.

11. The image processing apparatus according to claim 4, wherein the first image data characteristic is a characteristic indicating that a two-dimensional code included in the generated image data is located at a specified position within an image included in the generated image data.

12. The image processing apparatus according to claim 1, wherein the second processor is further configured to execute the second OS program such that, when the selected application program is a slip reading application, the second processor, confirms a two-dimensional code included in the image data stored in the operation unit, and defines a file name for the image data and store in a folder storage, based on the two-dimensional code.

13. The image processing apparatus according to claim 1, wherein:

the main body includes a second storage, the first processor is configured to, execute a scan in response to the instruction for scanning from the operation unit and store image data in the first storage, convert the image data stored in the first storage to first information including an image parameter indicating specific image data, and transmit the first information to the operation unit, the first information including the image data stored in the first storage and the image parameter, the operation unit includes the first storage, and the second processor is configured to, determine whether a selection condition stored in the first storage matches with the transmitted image parameter, and display an application on the selection screen based on the determining of whether the selection condition stored in the first storage matches with the transmitted image parameter.

14. The image processing apparatus according to claim 1, wherein the second processor is further configured to, by executing the second OS program, display an application selection screen including a part of the one or more first application programs on an operation panel, and process, via the selected application program, operating under the second OS program, the image data.

15. An image processing method executed in an image processing apparatus having a main body and an operation unit user interface, the main body including a scanner, a first memory storing a first operating system (OS) program, and a first processor, the operation unit user interface including a display, a second memory storing a second OS program and a plurality of application programs, and a second processor, the image processing method comprising:

storing, in storage, a plurality of selection conditions, each of the plurality of selection conditions identifying, an input control device, from among a plurality of input control devices, an image data characteristic, from among a plurality of image data characteristics, and an application program, from among a plurality of application programs, to be enabled for selection when image data generated under control of the identified input control device is determined by the second processor to include the identified image data characteristic, sending, via the second processor, an instruction for scanning to the main body in response to the user interface receiving a user operation, receiving, via the second processor, generated image data from the main body, analyzing the generated image data, based on the image data characteristic identified by at least one selection condition among the plurality of selection conditions stored in the storage, based on the analysis of the generated image data, identifying one or more application programs, from among the plurality of application programs, as being suitable for processing the generated image data, displaying, on the display, a selection screen including the identified one or more application programs, and in response to receiving a selection of an application program to be executed among the identified one or more application programs, activating the selected application program by reading from the second memory to cause the selected application program to process the generated image data.

16. A non-transitory computer-readable medium storing computer-executable instructions that, when executed by one or more processors, cause the one or more processors to perform operations of an operation unit user interface of an image processing apparatus, the image processing apparatus further including a main body, the user interface including a display, the operations including:

storing, in storage, a plurality of selection conditions, each of the plurality of selection conditions identifying, an input control device, from among a plurality of input control devices, an image data characteristic, from among a plurality of image data characteristics, and an application program, from among a plurality of application programs, to be enabled for selection when image data generated under control of the identified input control device is determined by the one or more processors to include the identified image data characteristic, receiving, via the user interface, a user operation, sending an instruction for scanning to the main body in response to the user operation, receiving generated image data from the main body, analyzing the generated image data, based on the image data characteristic identified by at least one selection condition among the plurality of selection conditions stored in the storage, based on the analysis of the generated image data, identifying one or more application programs, from among a plurality of application programs, as being suitable for processing the generated image data, displaying, on the display, a selection screen including the identified one or more application programs, and in response to receiving a selection of an application program to be executed among the identified one or more application programs, activating the selected application program by reading from a memory of the operation unit user interface to cause the selected application program to process the generated image data.

* * * * *